Feb. 16, 1965     F. ARMANNO     3,169,499
MULTIPURPOSE DESOLDERING DEVICE
Filed June 28, 1963
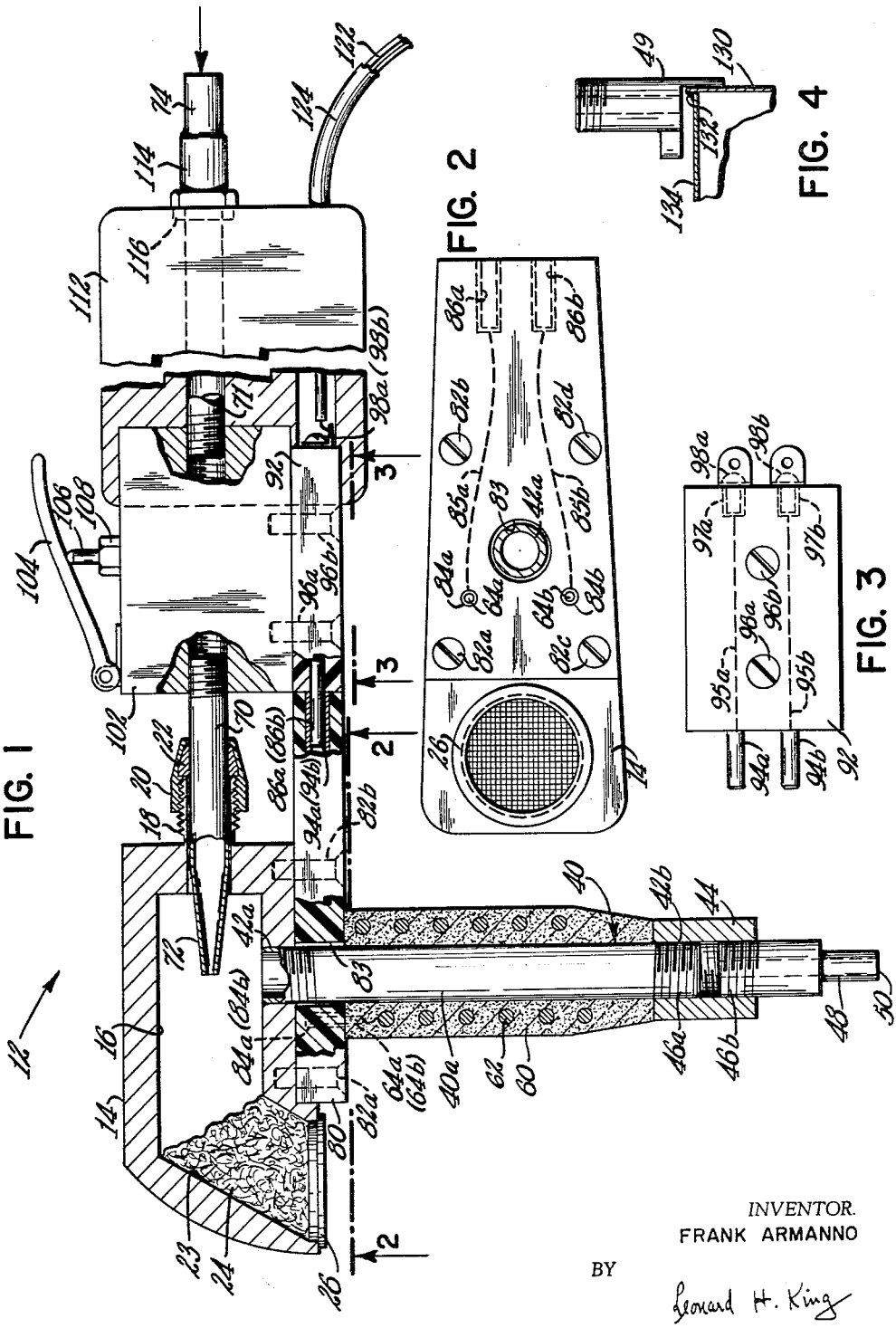
INVENTOR.
FRANK ARMANNO
BY
*Leonard H. King*
ATTORNEY ３,169,499
MULTIPURPOSE DESOLDERING DEVICE
Frank Armanno, 21 Pompano Lane,
Massapequa Park, N.Y.
Filed June 28, 1963, Ser. No. 291,381
3 Claims. (Cl. 113—59)

This application is a continuation-in-part of my copending application Serial No. 191,406, filed April 27, 1962 now abandoned.

This invention relates to a device for melting and removing solder from soldered joints or connections of the various components used in electronic or electrical circuitry leaving such joints free of solder.

The term "desoldering," as used herein, encompasses the removal of solder together wtih any coatings, such as fungicidal lacquer, which may also be present at the point where the desoldering is being accomplished.

At times it is necessary to unsolder connections and remove or replace circuit components. This applies especially to circuit cards and components secured to printed circuit boards. The ordinary solder guns or soldering coppers or irons, designed principally for use in making soldered joints, do not perform the function of unsoldering with equal facility, since no means is provided to dispose of the solder other than to shake or brush off the solder immediately after remelting it. Besides being impractical in many cases, it may result in droplets of solder falling into surrounding electronic circuitry ultimately causing trouble.

In many instances, the desoldering tool must also remove a resinous protective coating. Such coatings are generally applied to prevent fungus growth and to moistureproof the device.

Examples exist in current patent literature of solder melting devices where the solder at the required location is melted, then removed by suction and collected in the device itself or in a porous bag attached to the device. The use of an external bag is unwieldy and the necessity of disassembling the melting device to pick out the deposited solder is impractical. In the present device, the melted solder and resins, etc., are passed through a superheated chamber where they are heated and then hurled into the path of the high velocity jet of cooled air. The rapidly expanded air from the jet is of course cooler than the compressed air supplied to the unit. The ensuing violent but small scale explosion disintegrates the material into a vapor which passes into the filter together with iron filings, bits of copper wire, and other residue. Replacing the filter, which may be required after about a year of operation, involves only the removal of a cap-like screen, pulling out the filter, refilling the filter chamber with steel wool, foam neoprene, glass fiber, or other suitable filter material, and replacing the screen cap.

Solder melting and removing devices utilizing the suction principle in prior art have generally used conical or pyramidal tips having a passageway therein for the purpose of drawing up the solder therethrough by suction, no provision having been made for the use of alternative shapes of tips. In the present invention, the tip is readily changeable to any of several forms.

So far as known, in the prior art, the solder melting and removal devices make no provision for interchangeable heating elements; in fact, if the heating element becomes defective, it generally necessitates replacement of the entire device or at least the major portion thereof. In the present invention, the heating element can be readily removed without tools and replaced by a similar one or another of different wattage, if desired.

So far as known, in the prior art, the solder melting and removal devices do not incorporate any provision for use of the main air stream other than to create suction for the pickup of the melted solder. In the present invention, the main air stream, mixed with the heated air from the pickup nozzle, is directed at low velocity through the filter housing orifice and is available for quick drying of such coatings as fungicidal lacquer or for the shrinking of special plastic insulating sleeving designed to contract upon application of heat.

Accordingly, it is an object of the invention to provide a suitable means for desoldering electronic and electrical circuit components, the removed solder being vaporized within the device.

Another object of the invention is to provide a suitable means for the melting and removal of various types of thermoplastic materials used to coat soldered joints or connections.

A further object of the invention is to provide adaptable means for use of heating elements of various wattage, thereby widening the useful scope of the device.

A particular object of the invention is to provide means to superheat the removed material.

Another object of the invention is to provide a venturi-type desoldering tool having means to heat the material between the venturi and the entrance orifice.

Another object is to provide adaptable means for use of various types of desoldering tips.

An additional object of the invention is to provide a means of directing a stream of warm air against an area where the drying of lacquer or other coating material may be speeded.

Another object of the invention is to provide a soldering device utilizing a selection of soldering tips together with a choice of heating elements.

These and other objects of the invention will, in part, be pointed out with particularity and will, in part, be apparent from the following more detailed description, taken in conjunction with the drawing which forms an integral part thereof.

In the various figures of the drawing, like reference characters denote like parts.

In the drawing:

FIG. 1 is a side elevation partially sectioned;

FIG. 2 is a bottom view in plan with heating element, sleeve and tip removed for simplicity;

FIG. 3 is a fragmentary bottom view in plan showing interconnecting electrical detail.

FIG. 4 is a cross section application drawing showing a melting and cleaning tip suitable for unsealing cased or potted components or circuits.

In FIG. 1, the multipurpose desoldering device is represented by numeral 12. Metal housing 14 comprises a chamber 16, at one end of which is adjustably inserted nozzle 72 which is formed at the end of air feed pipe 70. Pipe 70 is threadably received by valve housing 102, and lockable by means of nut 20 and packing 22. The valve is a standard air valve and need not be shown in detail. Packing 22, usually of a graphitic composition, besides serving as a means of locking the physical relationship between nozzle 72 and pipe 40, also reduces heat transfer from pipe 70 to valve housing 102 and valve lever 104, thereby making prolonged use of the device more comfortable for the operator. Also entering chamber 16 in the area of nozzle 72, and at a right angle thereto, is vacuum or suction pipe 40. At the end of chamber 16 opposite and farthest from nozzle 72, chamber 16 terminates in a channel 23 disposed at an angle to the main portion of the chamber, the channel being filled with a metallic, glass fiber, or foam neoprene exhaust filter 24, the channel being capped with readily removable screen cap 26.

Secured to housing 14 by screws 82a through 82d is heatproof insulator 80 which encapsulates electrical sockets 84a and 84b, electrical wires 85a and 85b (see FIG. 2), and sockets 86a and 86b at the handle end of insulator 80. Sockets 84a and 84b mate pins 64a and 64b which are connected to the electrical winding 62 of heating element 60. Suction or vacuum pipe 40 is threadably inserted at 42a into housing 14 through clearance hole 83 in insulator 80. Heating element 60 is supplied with a coaxial clearance hole for pipe 40. When oriented correctly, pins 64a and 64b mate with sockets 84a and 84b permitting heating element 60 to seat against insulator 80. Heating element 60 is secured by affixing threaded copper sleeve 44 whose female thread 46a engages thread 42b causing heating element 60 to be drawn firmly against insulator 80. Threaded tubular tip 48 engages thread 46b at the tip end of sleeve 44.

Electrical sockets 86a and 86b mate pins 94a and 94b at the housing end of heatproof insulator 92. At the handle end of insulator 92 are screws 98a and 98b which provide a means of connecting the two wires of wire pair 122 thereto for the purpose of supplying electrical power to heating element 60. Encapsulated wires 95a and 95b connect pins 94a and 94b, respectively, to inserts 97a and 97b to provide circuit continuity through insulator 92. Insulator 92 is secured to body 102 by screws 96a and 96b. The wire pair connecting to screws 98a and 98b is fed through a longitudinal clearance hole in handle 112 exiting through sleeving 124.

Valve housing 102 mounts valve lever 104 which operates air valve 106 in pressurized air line comprised of pipes 70 and 71. Valve 106 is secured in valve housing 102 by locknut 108. Pipe 71 passes through a clearance hole in handle 112. Valve housing 102, with insulator 92 secured thereto, is inset into a mating portion of handle 112, the handle being locked to the operating portion of the device by bushing 116 and locknut 114. Pipe 71 terminates in a standard pressurized air line fitting 74.

Vacuum for operation of the device is provided by the venturi principle. After the device has been connected to the electrical power source and pressurized air line and the heating element 60 allowed to warm the tip 48 to the proper temperature, solder, as well as any thermoplastic material present of a sufficiently low melting point, may be melted by touching the tip 48 to the solder and/or thermoplastic coating. When the solder and coating melt, the pressing of the valve lever 104 causes the flow of air to be ejected through nozzle 72 at relatively high speed. The air exhausts through chamber 14 into filter 24 and the surrounding atmosphere. The action of the air stream passing over the opening in suction pipe 40 causes a vacuum to be created in pipe 40; this vacuum or suction is communicated through pipe 40, and the hole in sleeve 44 and to bore 50 in tip 48. The solder melts because of contact with the tip 48 and is sucked up through bore 50 into the superheated portion 40a of pipe 40 where the solder and organic material present are further heated. The solder and other contaminants exit from the 42a end of pipe 40 mixing with the cooler air stream and dispersing in fine particles at the filter 24, the particles being small enough to appear, after continued use of the device, as a light deposit or grayish coating on the chamber side of the filter.

It has been found that the present invention will remove other materials such as sealing compounds, pitch, hardened grease, shellac and the like, the superheating feature of the device at the same time serving to decompose the removed material or contaminant.

FIG. 4 illustrates tip 49 which is especially shaped to utilize the present invention to unseal or remove the solder 132 at the joint or seal of coverplate 134 and container or can 130.

There have been disclosed heretofore the best embodiments of the invention presently contemplated and it is to be understood that various changes and modifications may be made by those skilled in the art without departing from the spirit of the invention.

What is claimed is:
1. An electrically heated desoldering device adapted to operate from an external source of pressurized air comprising:
 (A) an inlet pipe having first and second ends,
  (1) means to connect said first end to said source of pressurized air;
 (B) an elongated housing disposed in coaxial relationship with said inlet pipe, said housing being provided with a chamber having an air inlet port, a melted solder passageway having an outlet port at one end positioned within the chamber proximate to the second end of said inlet pipe and an inlet port at the opposite end of the melted solder passageway and an air exhaust port positioned downstream from the air inlet port and the melted solder passageway outlet port,
  (1) said air inlet port being adapted to receive said air inlet pipe whereby said chamber is in communication with said source of pressurized air;
 (C) heating means having a bore extending therethrough,
  (1) said heating means bore being coextensive with said melted solder inlet port and in communication with said chamber; and
 (D) a desoldering tip removably secured coaxially with said heating means and having a bore communicating with said heating means bore,
 (E) solder collecting means removably contained within said housing chamber opposite the second end of said air inlet pipe and proximate the air exhaust port.

2. An electrically heated desoldering tool adapted to operate from an external source of pressurized air comprising:
 (A) a double ended air inlet pipe having means for connection to said source of pressurized air at one end and a nozzle at the other end;
 (B) an air valve adapted to regulate the flow of air through said air inlet pipe;
 (C) a housing comprised of a chamber having an externally threaded port to receive said air inlet pipe, a melted solder passageway having an outlet port at one end positioned within the chamber proximate to the nozzle of said air inlet pipe and an inlet port at the opposite end of the melted solder passageway and an air outlet port positioned downstream from the air inlet pipe nozzle and the melted solder passageway outlet port;
 (D) melted solder collection means removably disposed within said housing chamber proximate the air exhaust port;
 (E) clamping means adapted to adjustably position and clamp said air inlet pipe in said chamber;
 (F) an electrically nonconductive block secured to said housing, said block having first and second pairs of terminals disposed therein, said pairs of terminals being electrically interconnected;
 (G) electrical heating means having a central bore therethrough, said bore being positioned substantially at right angles to said air inlet pipe, said bore being in communication with said chamber, said heating means being provided with a pair of terminals adapted to plug into said first pair of terminals;
 (H) a threadably removable heat conductive desoldering tip having a central bore in communication with said heating means bore, said tip bore being of smaller diameter than said heating means bore; and
 (I) conductor means for connection to a source of electrical power, said conductor means having a pair of terminals adapted to plug into said second pair of terminals.

3. The apparatus of claim 2 wherein said clamping means comprises a low heat transfer graphitic material and a clamping nut, said nut containing said graphitic material, said nut being adapted to mate with said externally threaded inlet port.

References Cited by the Examiner
UNITED STATES PATENTS

| | | | |
|---|---|---|---|
| 2,025,509 | 12/35 | Hieber | 219—27.1 |
| 2,491,165 | 12/49 | De Rugeris | 219—27.1 |
| 2,609,778 | 9/52 | Bleam et al. | 219—26 |
| 2,826,667 | 3/58 | Brillinger | 219—26 |
| 2,955,188 | 10/60 | Campo | 219—26 |
| 3,045,095 | 7/62 | Usher et al. | 219—26 |

CHARLES W. LANHAM, *Primary Examiner.*

ANTHONY BARTIS, *Examiner.*